(12) United States Patent
Mason, Jr. et al.

(10) Patent No.: US 9,698,865 B2
(45) Date of Patent: *Jul. 4, 2017

(54) SYNCHRONOUS FREQUENCY HOPPING SPREAD SPECTRUM COMMUNICATIONS

(71) Applicant: ELSTER SOLUTIONS, LLC, Raleigh, NC (US)

(72) Inventors: Robert T. Mason, Jr., Raleigh, NC (US); Kenneth C. Shuey, Zebulon, NC (US); Rodney C. Hemminger, Raleigh, NC (US); Kuor Hsin Chang, Sunnyvale, CA (US)

(73) Assignee: Elster Solutions, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,648

(22) Filed: May 6, 2016

(65) Prior Publication Data
US 2016/0277066 A1 Sep. 22, 2016

Related U.S. Application Data

(63) Continuation of application No. 14/517,108, filed on Oct. 17, 2014, now Pat. No. 9,362,978.
(Continued)

(51) Int. Cl.
*H04B 1/7156* (2011.01)
*H04W 84/18* (2009.01)
(Continued)

(52) U.S. Cl.
CPC ......... *H04B 1/7156* (2013.01); *H04B 7/2628* (2013.01); *H04H 20/16* (2013.01);
(Continued)

(58) Field of Classification Search
CPC .................. H04B 1/713; H04B 1/7156; H04B 2001/71563; H04B 2201/713;
(Continued)

(56) References Cited

U.S. PATENT DOCUMENTS 4,850,036 A   7/1989 Smith
6,014,406 A * 1/2000 Shida ................... H04B 1/7156
                                              370/221
(Continued)

OTHER PUBLICATIONS

Garg et al., "Spread Spectrum—Safe haven for wireless consumer applications—Part III", EDN Network, Mar. 4, 2013, 5 pages.
(Continued)

*Primary Examiner* — Sophia Vlahos
(74) *Attorney, Agent, or Firm* — Baker & Hostetler LLP

(57) ABSTRACT

Synchronous FHSS networks operating within mesh networks typically require a certain amount of network traffic to maintain time as well as for executing other functions, such as registration and neighbor discovery. The concepts presented in this disclosure provide a mesh network with enhanced communication capabilities without adding significant hardware or firmware costs to nodes within the network. The disclosed concept of using acquisition channels (frequencies) integrated within FHSS pseudo-random sequences speeds network responses to conditions like outage and restoration. Assignment of unique hop sequences by hop level or at time of manufacture can guarantee minimal network contention while minimizing system network traffic.

19 Claims, 6 Drawing Sheets

Related U.S. Application Data

(60) Provisional application No. 61/892,774, filed on Oct. 18, 2013.

(51) Int. Cl.
*H04B 7/26* (2006.01)
*H04H 20/16* (2008.01)
*H04B 1/713* (2011.01)

(52) U.S. Cl.
CPC .............. *H04W 84/18* (2013.01); *H04B 1/713* (2013.01); *H04B 2001/71563* (2013.01)

(58) Field of Classification Search
CPC ........... H04B 2201/71323; H04B 2201/71338; H04H 20/16; H04Q 2209/25; H04W 84/12
See application file for complete search history.

(56) References Cited

U.S. PATENT DOCUMENTS

| | | | |
|---|---|---|---|
| 7,729,329 B2* | 6/2010 | Fujita | H04W 74/0816 |
| | | | 370/342 |
| 8,553,743 B1 | 10/2013 | Nichols et al. | |
| 9,362,978 B2* | 6/2016 | Mason, Jr. | H04B 1/7156 |
| 2002/0141479 A1 | 10/2002 | Garcia-Luna-Aceves et al. | |
| 2007/0211790 A1* | 9/2007 | Agrawal | H04B 1/713 |
| | | | 375/147 |
| 2009/0167521 A1 | 7/2009 | Edwards et al. | |
| 2010/0173594 A1 | 7/2010 | Stettler et al. | |
| 2013/0016758 A1 | 1/2013 | Hui et al. | |
| 2013/0215932 A1 | 8/2013 | Shuey et al. | |

OTHER PUBLICATIONS

Micrel, "Application Note 51 Frequency Hopping Techniques", Rev 1.0, Jun. 2006, http://www.mircel.com, 1-7.

* cited by examiner

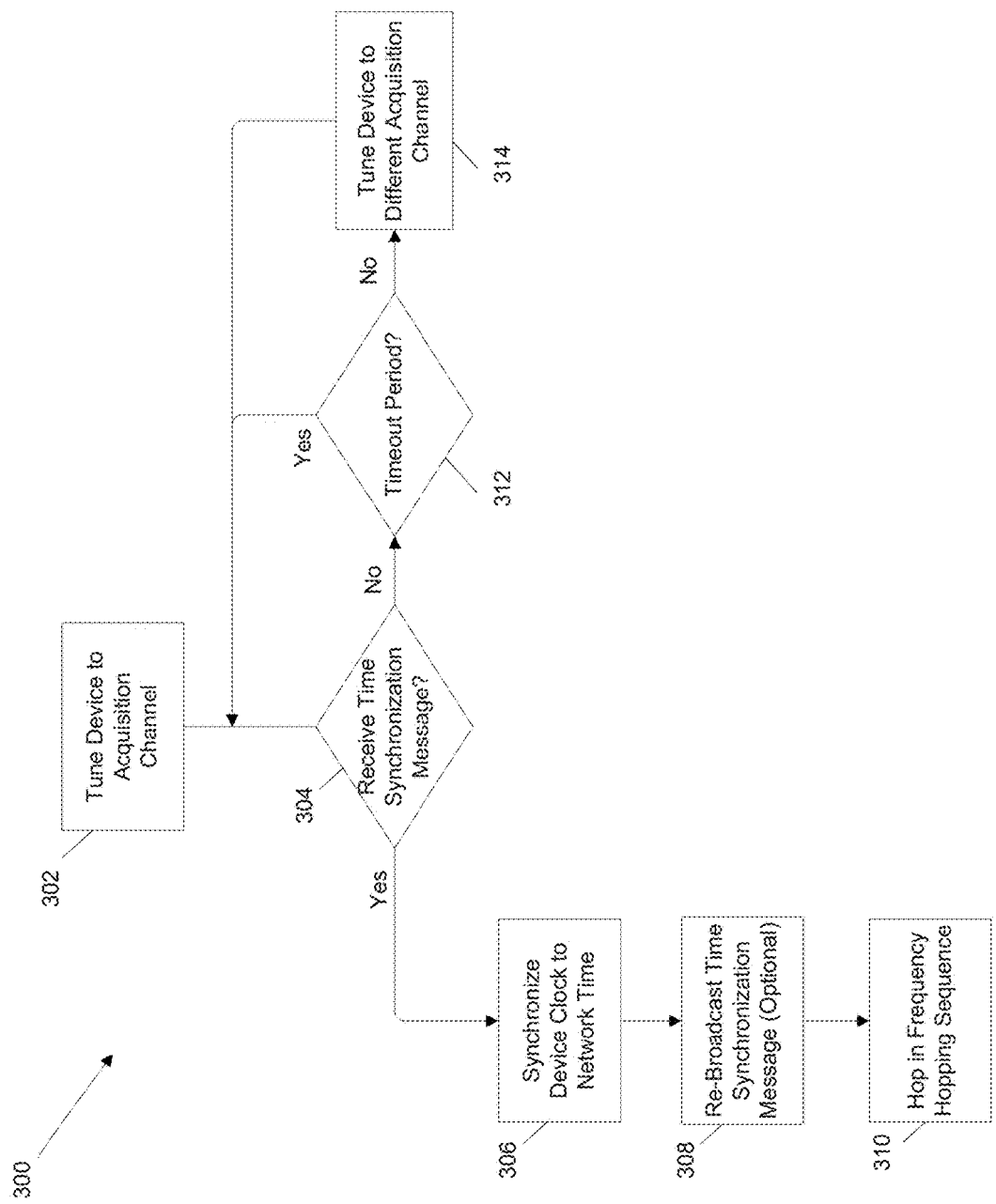

Table 1

| | | Frequency Hopping Sequences | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Network Time Slot | t( 0 ) | 0 | 61 | 58 | 55 | 51 | 48 | 45 | 42 | 39 | 35 | 32 | 29 | 26 | 23 | 19 | 16 |
| | t( 1 ) | 1 | 62 | 59 | 56 | 53 | 49 | 46 | 43 | 40 | 37 | 33 | 30 | 27 | 24 | 21 | 17 |
| | t( 2 ) | 2 | 63 | 60 | 57 | 54 | 50 | 47 | 44 | 41 | 38 | 34 | 31 | 28 | 25 | 22 | 18 |
| | t( 3 ) | 3 | 0 | 61 | 58 | 55 | 51 | 48 | 45 | 42 | 39 | 35 | 32 | 29 | 26 | 23 | 19 |
| | t( 4 ) | 4 | 4 | 4 | 4 | 4 | 4 | 4 | 4 | 4 | 4 | 4 | 4 | 4 | 4 | 4 | 4 |
| | t( 5 ) | 5 | 1 | 62 | 59 | 56 | 53 | 49 | 46 | 43 | 40 | 37 | 33 | 30 | 27 | 24 | 21 |
| | t( 6 ) | 6 | 2 | 63 | 60 | 57 | 54 | 50 | 47 | 44 | 41 | 38 | 34 | 31 | 28 | 25 | 22 |
| | t( 7 ) | 7 | 3 | 0 | 61 | 58 | 55 | 51 | 48 | 45 | 42 | 39 | 35 | 32 | 29 | 26 | 23 |
| | t( 8 ) | 8 | 5 | 1 | 62 | 59 | 56 | 53 | 49 | 46 | 43 | 40 | 37 | 33 | 30 | 27 | 24 |
| | t( 9 ) | 9 | 6 | 2 | 63 | 60 | 57 | 54 | 50 | 47 | 44 | 41 | 38 | 34 | 31 | 28 | 25 |
| | t( 10 ) | 10 | 7 | 3 | 0 | 61 | 58 | 55 | 51 | 48 | 45 | 42 | 39 | 35 | 32 | 29 | 26 |
| | t( 11 ) | 11 | 8 | 5 | 1 | 62 | 59 | 56 | 53 | 49 | 46 | 43 | 40 | 37 | 33 | 30 | 27 |
| | t( 12 ) | 12 | 9 | 6 | 2 | 63 | 60 | 57 | 54 | 50 | 47 | 44 | 41 | 38 | 34 | 31 | 28 |
| | t( 13 ) | 13 | 10 | 7 | 3 | 0 | 61 | 58 | 55 | 51 | 48 | 45 | 42 | 39 | 35 | 32 | 29 |
| | t( 14 ) | 14 | 11 | 8 | 5 | 1 | 62 | 59 | 56 | 53 | 49 | 46 | 43 | 40 | 37 | 33 | 30 |
| | t( 15 ) | 15 | 12 | 9 | 6 | 2 | 63 | 60 | 57 | 54 | 50 | 47 | 44 | 41 | 38 | 34 | 31 |
| | t( 16 ) | 16 | 13 | 10 | 7 | 3 | 0 | 61 | 58 | 55 | 51 | 48 | 45 | 42 | 39 | 35 | 32 |
| | t( 17 ) | 17 | 14 | 11 | 8 | 5 | 1 | 62 | 59 | 56 | 53 | 49 | 46 | 43 | 40 | 37 | 33 |
| | t( 18 ) | 18 | 15 | 12 | 9 | 6 | 2 | 63 | 60 | 57 | 54 | 50 | 47 | 44 | 41 | 38 | 34 |
| | t( 19 ) | 19 | 16 | 13 | 10 | 7 | 3 | 0 | 61 | 58 | 55 | 51 | 48 | 45 | 42 | 39 | 35 |
| | t( 20 ) | 20 | 20 | 20 | 20 | 20 | 20 | 20 | 20 | 20 | 20 | 20 | 20 | 20 | 20 | 20 | 20 |
| | t( 21 ) | 21 | 17 | 14 | 11 | 8 | 5 | 1 | 62 | 59 | 56 | 53 | 49 | 46 | 43 | 40 | 37 |
| | t( 22 ) | 22 | 18 | 15 | 12 | 9 | 6 | 2 | 63 | 60 | 57 | 54 | 50 | 47 | 44 | 41 | 38 |
| | t( 23 ) | 23 | 19 | 16 | 13 | 10 | 7 | 3 | 0 | 61 | 58 | 55 | 51 | 48 | 45 | 42 | 39 |
| | t( 24 ) | 24 | 21 | 17 | 14 | 11 | 8 | 5 | 1 | 62 | 59 | 56 | 53 | 49 | 46 | 43 | 40 |
| | t( 25 ) | 25 | 22 | 18 | 15 | 12 | 9 | 6 | 2 | 63 | 60 | 57 | 54 | 50 | 47 | 44 | 41 |
| | t( 26 ) | 26 | 23 | 19 | 16 | 13 | 10 | 7 | 3 | 0 | 61 | 58 | 55 | 51 | 48 | 45 | 42 |
| | t( 27 ) | 27 | 24 | 21 | 17 | 14 | 11 | 8 | 5 | 1 | 62 | 59 | 56 | 53 | 49 | 46 | 43 |
| | t( 28 ) | 28 | 25 | 22 | 18 | 15 | 12 | 9 | 6 | 2 | 63 | 60 | 57 | 54 | 50 | 47 | 44 |
| | t( 29 ) | 29 | 26 | 23 | 19 | 16 | 13 | 10 | 7 | 3 | 0 | 61 | 58 | 55 | 51 | 48 | 45 |
| | t( 30 ) | 30 | 27 | 24 | 21 | 17 | 14 | 11 | 8 | 5 | 1 | 62 | 59 | 56 | 53 | 49 | 46 |
| | t( 31 ) | 31 | 28 | 25 | 22 | 18 | 15 | 12 | 9 | 6 | 2 | 63 | 60 | 57 | 54 | 50 | 47 |
| | t( 32 ) | 32 | 29 | 26 | 23 | 19 | 16 | 13 | 10 | 7 | 3 | 0 | 61 | 58 | 55 | 51 | 48 |

FIG. 4A

Table 1 (continued)

| | Frequency Hopping Sequences | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| t(33) | 33 | 30 | 27 | 24 | 21 | 17 | 14 | 11 | 8 | 5 | 1 | 62 | 59 | 56 | 53 | 49 |
| t(34) | 34 | 31 | 28 | 25 | 22 | 18 | 15 | 12 | 9 | 6 | 2 | 63 | 60 | 57 | 54 | 50 |
| t(35) | 35 | 32 | 29 | 26 | 23 | 19 | 16 | 13 | 10 | 7 | 3 | 0 | 61 | 58 | 55 | 51 |
| t(36) | 36 | 36 | 36 | 36 | 36 | 36 | 36 | 36 | 36 | 36 | 36 | 36 | 36 | 36 | 36 | 36 |
| t(37) | 37 | 33 | 30 | 27 | 24 | 21 | 17 | 14 | 11 | 8 | 5 | 1 | 62 | 59 | 56 | 53 |
| t(38) | 38 | 34 | 31 | 28 | 25 | 22 | 18 | 15 | 12 | 9 | 6 | 2 | 63 | 60 | 57 | 54 |
| t(39) | 39 | 35 | 32 | 29 | 26 | 23 | 19 | 16 | 13 | 10 | 7 | 3 | 0 | 61 | 58 | 55 |
| t(40) | 40 | 37 | 33 | 30 | 27 | 24 | 21 | 17 | 14 | 11 | 8 | 5 | 1 | 62 | 59 | 56 |
| t(41) | 41 | 38 | 34 | 31 | 28 | 25 | 22 | 18 | 15 | 12 | 9 | 6 | 2 | 63 | 60 | 57 |
| t(42) | 42 | 39 | 35 | 32 | 29 | 26 | 23 | 19 | 16 | 13 | 10 | 7 | 3 | 0 | 61 | 58 |
| t(43) | 43 | 40 | 37 | 33 | 30 | 27 | 24 | 21 | 17 | 14 | 11 | 8 | 5 | 1 | 62 | 59 |
| t(44) | 44 | 41 | 38 | 34 | 31 | 28 | 25 | 22 | 18 | 15 | 12 | 9 | 6 | 2 | 63 | 60 |
| t(45) | 45 | 42 | 39 | 35 | 32 | 29 | 26 | 23 | 19 | 16 | 13 | 10 | 7 | 3 | 0 | 61 |
| t(46) | 46 | 43 | 40 | 37 | 33 | 30 | 27 | 24 | 21 | 17 | 14 | 11 | 8 | 5 | 1 | 62 |
| t(47) | 47 | 44 | 41 | 38 | 34 | 31 | 28 | 25 | 22 | 18 | 15 | 12 | 9 | 6 | 2 | 63 |
| t(48) | 48 | 45 | 42 | 39 | 35 | 32 | 29 | 26 | 23 | 19 | 16 | 13 | 10 | 7 | 3 | 0 |
| t(49) | 49 | 46 | 43 | 40 | 37 | 33 | 30 | 27 | 24 | 21 | 17 | 14 | 11 | 8 | 5 | 1 |
| t(50) | 50 | 47 | 44 | 41 | 38 | 34 | 31 | 28 | 25 | 22 | 18 | 15 | 12 | 9 | 6 | 2 |
| t(51) | 51 | 48 | 45 | 42 | 39 | 35 | 32 | 29 | 26 | 23 | 19 | 16 | 13 | 10 | 7 | 3 |
| t(52) | 52 | 52 | 52 | 52 | 52 | 52 | 52 | 52 | 52 | 52 | 52 | 52 | 52 | 52 | 52 | 52 |
| t(53) | 53 | 49 | 46 | 43 | 40 | 37 | 33 | 30 | 27 | 24 | 21 | 17 | 14 | 11 | 8 | 5 |
| t(54) | 54 | 50 | 47 | 44 | 41 | 38 | 34 | 31 | 28 | 25 | 22 | 18 | 15 | 12 | 9 | 6 |
| t(55) | 55 | 51 | 48 | 45 | 42 | 39 | 35 | 32 | 29 | 26 | 23 | 19 | 16 | 13 | 10 | 7 |
| t(56) | 56 | 53 | 49 | 46 | 43 | 40 | 37 | 33 | 30 | 27 | 24 | 21 | 17 | 14 | 11 | 8 |
| t(57) | 57 | 54 | 50 | 47 | 44 | 41 | 38 | 34 | 31 | 28 | 25 | 22 | 18 | 15 | 12 | 9 |
| t(58) | 58 | 55 | 51 | 48 | 45 | 42 | 39 | 35 | 32 | 29 | 26 | 23 | 19 | 16 | 13 | 10 |
| t(59) | 59 | 56 | 53 | 49 | 46 | 43 | 40 | 37 | 33 | 30 | 27 | 24 | 21 | 17 | 14 | 11 |
| t(60) | 60 | 57 | 54 | 50 | 47 | 44 | 41 | 38 | 34 | 31 | 28 | 25 | 22 | 18 | 15 | 12 |
| t(61) | 61 | 58 | 55 | 51 | 48 | 45 | 42 | 39 | 35 | 32 | 29 | 26 | 23 | 19 | 16 | 13 |
| t(62) | 62 | 59 | 56 | 53 | 49 | 46 | 43 | 40 | 37 | 33 | 30 | 27 | 24 | 21 | 17 | 14 |
| t(63) | 63 | 60 | 57 | 54 | 50 | 47 | 44 | 41 | 38 | 34 | 31 | 28 | 25 | 22 | 18 | 15 |

(Network Time Slot)

FIG. 4B

SYNCHRONOUS FREQUENCY HOPPING SPREAD SPECTRUM COMMUNICATIONS

CROSS-REFERENCE

This application is a continuation of U.S. patent application Ser. No. 14/517,108 filed on Oct. 17, 2014, which claims the benefit under 35 U.S. §119(e) of Provisional U.S. Patent Application No. 61/892,774, filed on Oct. 18, 2013, and entitled "SYNCHRONOUS FHSS METHOD FOR MESH NETWORKS," the contents of both of which are incorporated by reference herein in their entireties.

TECHNICAL FIELD

The present invention relates to communication systems and methods, and more particularly, to systems, methods, and apparatus for improved performance in a wireless communications system.

BACKGROUND

Many utilities have begun to implement frequency hopping spread spectrum (FHSS) communications in a mesh network of metering devices. Some FHSS implementations operate in a synchronous mode in which receiving devices are substantially continuously synchronized with transmitting devices in time or frequency. Such synchronous implementations typically require the use of clock circuitry and require some amount of data traffic to maintain time within the system. Other FHSS implementations operate in a self-synchronous mode in which receiving devices are not synchronized at all times with transmitting devices in time or frequency. In such self-synchronous implementations, a receiving device scans a number of frequencies in the hop sequence in order to detect a preamble signal on one of the frequencies. Once detected, the receiving device will attempt to lock onto that channel, and the two devices will then begin hopping in sequence. While self-synchronous systems do not require the same type of clock circuitry as synchronous systems and avoid the communications overhead required to maintain synchronization among nodes, such systems do typically require a long preamble to be transmitted in order to provide sufficient opportunity for a receiver to scan and lock onto a channel. This itself may result in some data overhead.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

Disclosed herein are methods, systems, and apparatus for synchronous frequency hopping spread spectrum communications in a mesh network of utility meters. An embodiment of the present disclosure includes a communication system that includes at least a first network device and a second network device. Each network device has a transceiver. The first network device operates in accordance with a first frequency hopping sequence. The first frequency hopping sequence includes a plurality of data channels and at least one acquisition channel. The second network device operates in accordance with a second frequency hopping sequence. The second frequency hopping sequence includes a plurality of data channels and the at least one acquisition channel. The second frequency hopping sequence is different from the first frequency hopping sequence. The at least one acquisition channel of the first frequency hopping sequence and the at least one acquisition channel of the second frequency hopping sequence are arranged in their respective frequency hopping sequences such that when the second network device is tuned to the at least one acquisition channel of the second frequency hopping sequence, the first network device will be tuned to the at least one acquisition channel of the first frequency hopping sequence, and the frequency of the at least one acquisition channel in each of the first and the second frequency hopping sequences is the same.

Additionally, another embodiment of the present disclosure includes a method for communication. The method for communication includes assigning a first frequency hopping sequence to a first network device, wherein the first frequency hopping sequence includes a plurality of data channels and at least one acquisition channel; and assigning a second frequency hopping sequence to a second network device, wherein the second frequency hopping sequence includes a plurality of data channels and the at least one acquisition channel. The second frequency hopping sequence is different from the first frequency hopping sequence. The at least one acquisition channel of the first frequency hopping sequence and the at least one acquisition channel of the second frequency hopping sequence are arranged in their respective frequency hopping sequences such that when the second network device is tuned to the at least one acquisition channel of the second frequency hopping sequence, the first network device will be tuned to the at least one acquisition channel of the first frequency hopping sequence, and the frequency of the at least one acquisition channel in each of the first and the second frequency hopping sequences is the same.

This summary is provided to introduce a selection of concepts in a simplified form that are further described below in the Description of the Invention section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings, wherein:

FIG. 3 is a flowchart illustrating one embodiment of a method for time synchronization, according to an aspect of the disclosure.

FIGS. 4A and 4B illustrate a table containing frequency hopping sequences, according to an aspect of this disclosure.

DESCRIPTION OF THE INVENTION

Disclosed herein are methods, systems, and apparatus for communications in a frequency hopping communications network for use in utility metering, and in particular, for synchronizing network devices (e.g., utility meters) and broadcasting messages within such network. In the disclosed system, different ones of the meters may communicate in accordance with one of a plurality of different frequency hopping sequences. In accordance with one aspect, each of the plurality of different frequency hopping sequences includes at least one acquisition channel (i.e., frequency), one which the device utilizing that sequence can receive time synchronization messages, broadcasted messages, or other messages related to the network. Further in accordance with this aspect, the plurality of different frequency hopping sequences is configured such that the acquisition channels in the sequences coincide in time. That is, when one network device is tuned to an acquisition channel in the frequency hopping sequence utilized by that device, each of the other network devices within the network will also be tuned to the same acquisition channel in their respective hop sequences—even though the other frequencies in their respective hop sequences may not be the same. As described hereinafter, these acquisition channels may be used to facilitate synchronization of clock circuitry within each device with a common network time and to facilitate the transmission of broadcast messages to devices in the network.

Figure 1:
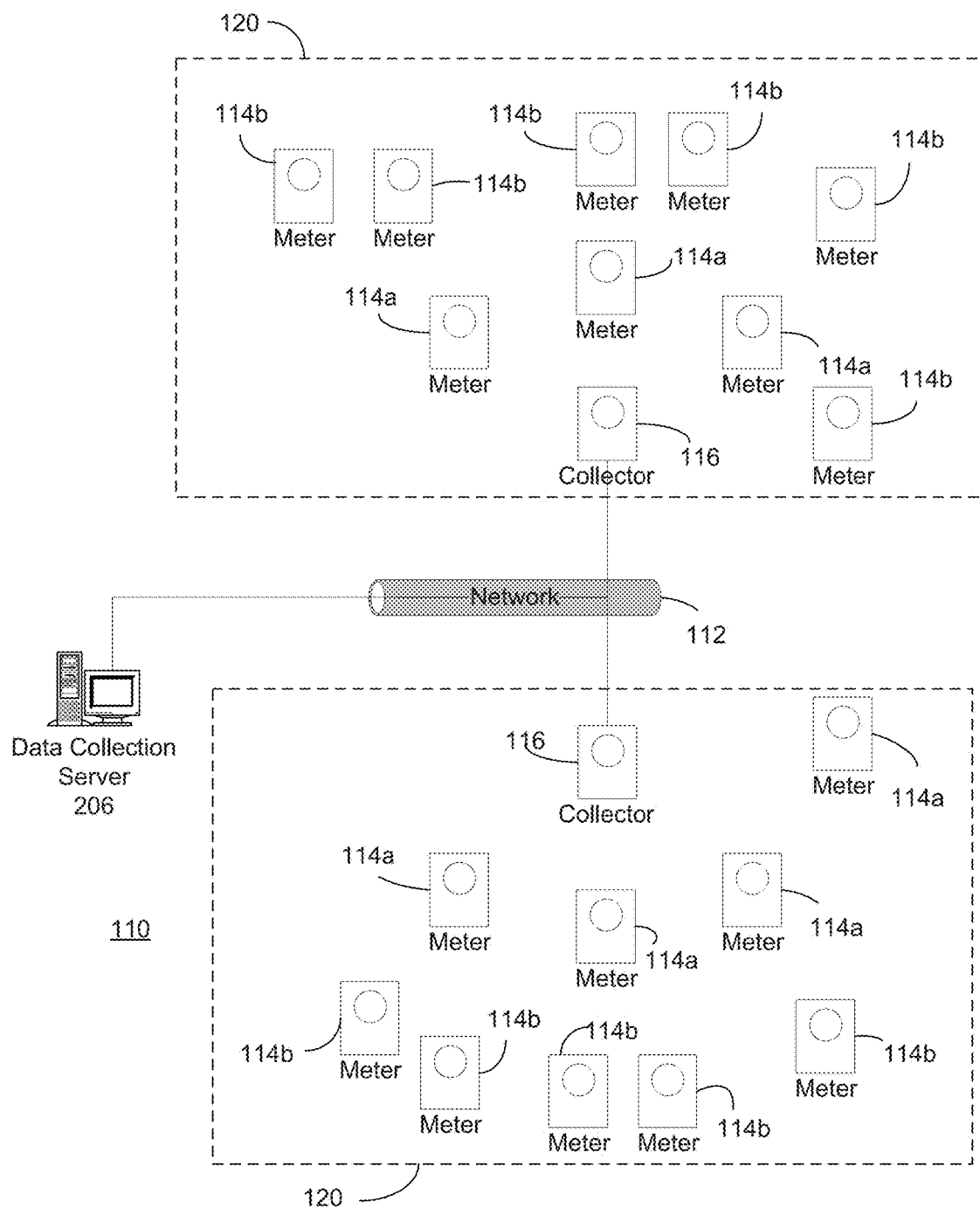
FIG. 1 illustrates one example of a metering system in which the systems, methods, and apparatus disclosed herein may be embodied.

FIG. 1 provides a diagram of an embodiment of a metering system 110 in which the methods, systems, and apparatus disclosed herein may be employed. System 110 comprises a plurality of meters 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bi-directional meters, the circuitry for transmitting and receiving may comprise a transceiver. In an illustrative embodiment, meters 114 may be, for example, electricity meters manufactured by Elster Solutions, LLC and marketed under the tradename REX.

System 110 further comprises collectors 116. In some embodiments, a collector 116 may also be referred to as a gatekeeper. In one embodiment, collectors 116 are also meters operable to detect and record usage of a service or commodity such as, for example, electricity, water, or gas. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using a frequency hopping communications technique, such as, for example, a frequency hopping spread spectrum (FHSS) technique.

A collector 116 and the meters 114 with which it communicates define a subnet/LAN 120 of system 110. As used herein, meters 114 and collectors 116 may be referred to as "network devices" or "devices" in the subnet 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a data collection server or head-end system 206. The data collection server 206 stores the data for analysis and preparation of bills, for example. The data collection server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a Frequency Hopping Spread Spectrum (FHSS) radio network, an ISM mesh network, a Wi-Fi (802.11) network, a Wi-Max (802.16) network, a land line (POTS) network, or any combination of the above.

Figure 2A:
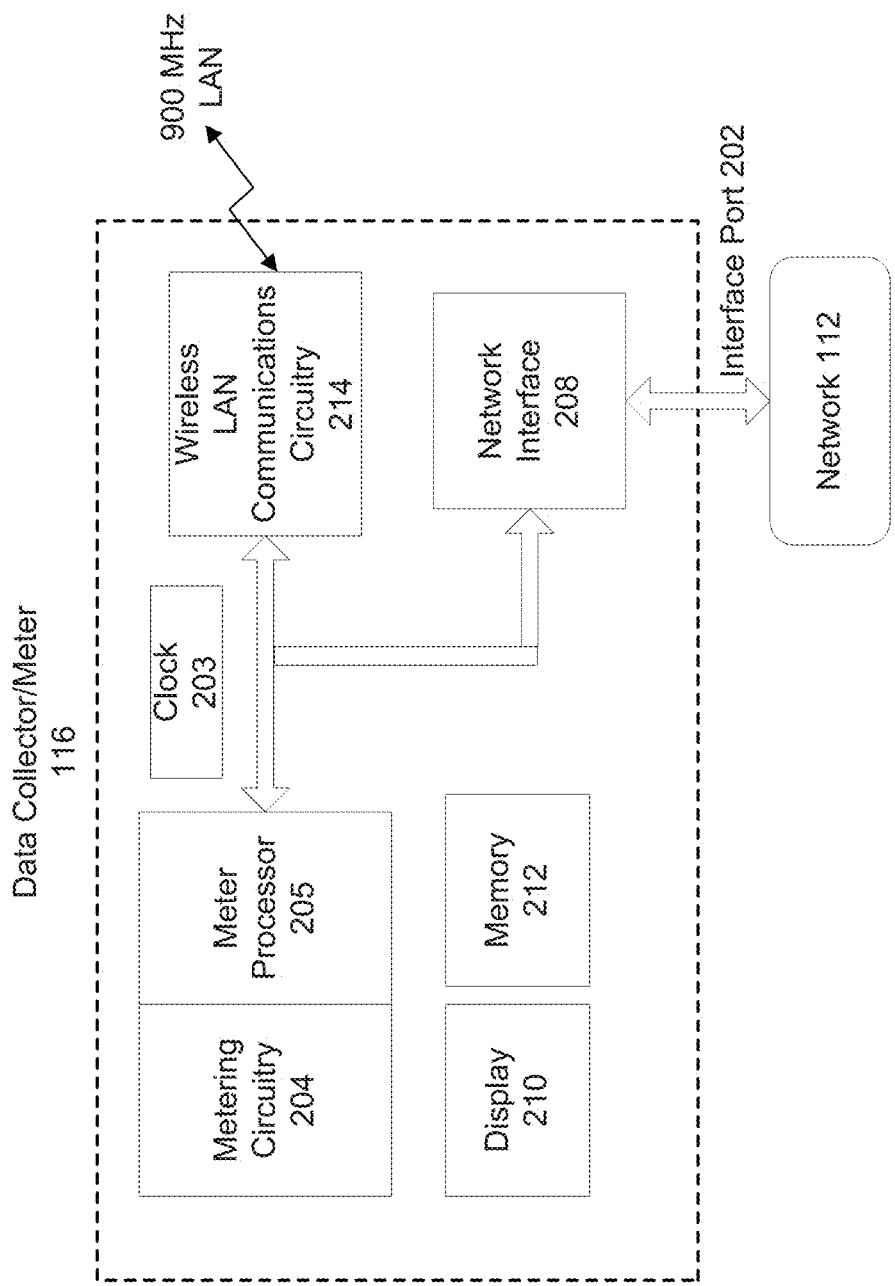
FIG. 2A illustrates a block diagram of a data collector/utility meter, according to an aspect of the disclosure.

FIG. 2A is a block diagram illustrating further details of one embodiment of a collector 116. Although certain components are designated and discussed with reference to FIG. 2A, it should be appreciated that the invention is not limited to such components. In fact, various other components typically found in an electronic meter may be a part of collector 116, but have not been shown in FIG. 2A for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 2A, collector 116 may comprise metering circuitry 204 that performs measurement of consumption of a service or commodity and a processor 205 that controls the overall operation of the metering functions of the collector 116. The collector 116 may further comprise a display 210 for displaying information such as measured quantities and meter status and a memory 212 for storing data. The collector 116 further comprises wireless LAN communications circuitry 214 for communicating wirelessly with the meters 114 in a subnet/LAN and a network interface 208 for communication over the network 112. As further shown, the collector 116 includes a clock circuit 203. The clock circuit 203 for the collector 116 may run off an internal 12 MHz crystal and may be adjusted from the central station on a daily basis (or more often). During outages, the clock circuit 203 may keep using a 32 kHz crystal. In an alternative embodiment, the collector 116 may use a 60 Hz line frequency for additional timing accuracy adjustments.

In one embodiment, the metering circuitry 204, processor 205, display 210 and memory 212 may be embodied in a commercially available meter, such as in an A3 ALPHA meter available from Elster Solutions, LLC. In that embodiment, the wireless LAN communications circuitry 214 may be implemented by a LAN Option Board (e.g., a 900 MHz two-way radio) installed within the A3 ALPHA meter, and the network interface 208 may be implemented by a WAN Option Board (e.g., a telephone modem) also installed within the A3 ALPHA meter. The WAN Option Board 208 routes messages from network 112 (via interface port 202) to either the meter processor 205 or the LAN Option Board 214. LAN Option Board 214 may use a transceiver (not shown), for example a 900 MHz radio, to communicate data to meters 114. Also, LAN Option Board 214 may have sufficient memory to store data received from meters 114. This data may include, but is not limited to the following: current billing data (e.g., the present values stored and displayed by meters 114), previous billing period data, previous season data, and load profile data.

Figure 2B:
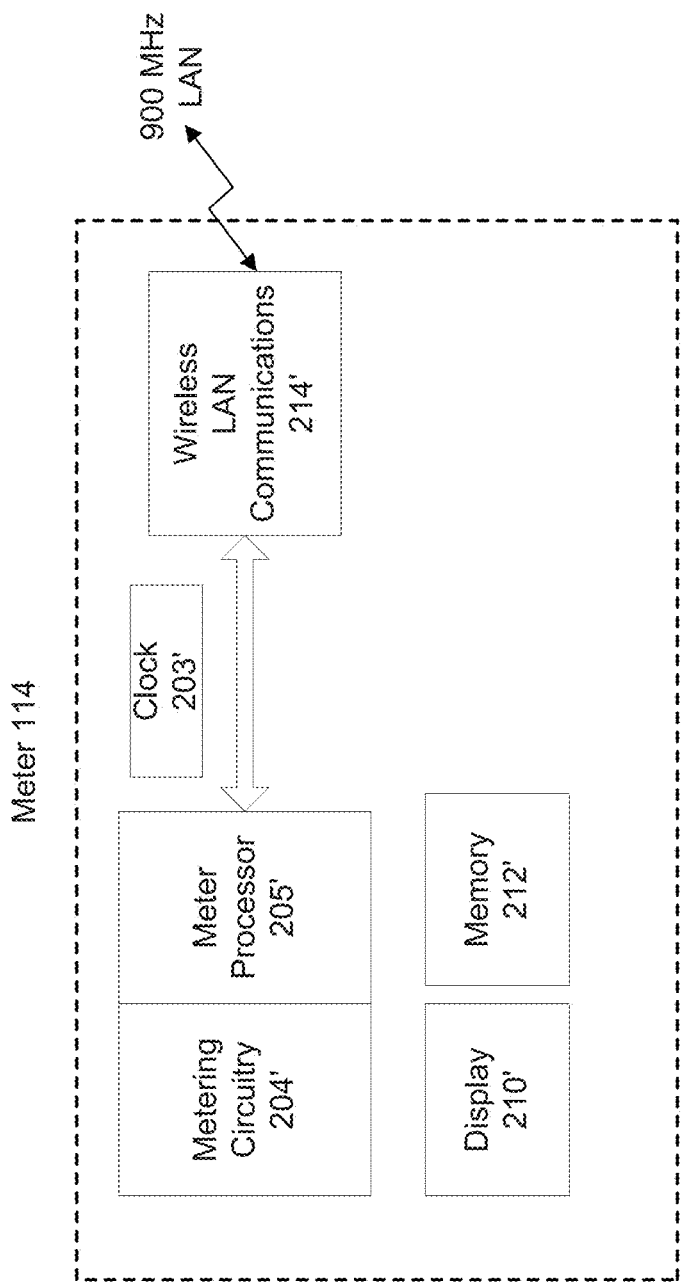
FIG. 2B illustrates a block diagram of a utility meter, according to an aspect of the disclosure.

FIG. 2B is a block diagram of an exemplary embodiment of a meter 114 that may operate in the system 110 of FIG. 1. As shown, the meter 114 comprises metering circuitry 204' for measuring the amount of a service or commodity that is consumed, a processor 205' that controls the overall functions of the meter, a display 210' for displaying meter data and status information, and a memory 212' for storing data and program instructions. The meter 114 further comprises wireless communications circuitry 214' for transmitting and receiving data to/from other meters 114 or a collector 116. The wireless communications circuitry 214' may be similar to or identical to the wireless communication circuitry 214 in the collector 116 of FIG. 2A. The meter 114 also comprises a clock circuit 203' like the collector 116. The clock circuit 203' may be similar or identical to the clock circuit 203 used in the collector 116.

The collector 116 may be responsible for managing, processing and routing data communicated between the collector 116 and network 112 and between the collector 116 and meters 114. Collector 116 may continually or intermittently receive current data from meters 114 and store the data in memory 212 or a database (not shown) in collector 116. Such current data may include but is not limited to the total kWh usage, the Time-Of-Use (TOU) kWh usage, peak kW demand, and other energy consumption measurements and status information. Collector 116 also may receive and store previous billing and previous season data from meters 114 and store the data in memory 212 or the database in collector 116. The database may be implemented as one or more tables of data within the collector 116.

In an embodiment, the metering system 110 may be an Advanced Metering Infrastructure (AMI) system which uses the ANSI C12.22 protocol for interfacing with the network 112. It should be appreciated that other protocols may be used for the methods and systems for data communications defined herein, for example, ANSI C12.21 and ANSI 12.18. The protocol makes provisions for encrypting data to enable secure communications, including confidentiality and data integrity, for the purpose of interoperability between metering devices and the network.

In an embodiment, the LAN/subnet formed by a collector 116 and the plurality of meters 114 that communicate with it may operate to form a wireless mesh network that implements FHSS techniques in the 900 MHz ISM band. It should be appreciated that the system and method disclosed herein may comply with Federal Communications Commission (FCC) part 15.247 while providing mechanisms for devices (e.g., meters 114 and collectors 116) to join, register, synchronize, and find neighbors within a LAN/subnet.

In accordance with one aspect of the methods, systems, and apparatus disclosed herein, in the metering system 110, each network device (e.g., meters 114 and collectors 116) is assigned, and operates in accordance with, one of a plurality N of different frequency hopping sequences. That is, the communications circuirty (i.e., transceiver) of the device communicates in accordance with FHSS techniques and employs one of the N frequency hopping sequences. The hopping sequence assigned to a particular device may be defined at the time of manufacture or assigned depending on other factors, such as, for example, the particular hop level of the device (i.e., the number communication hops from the device, through one or more intermediate devices, to a collector). In one embodiment, the devices may be equally distributed among the N hopping sequences.

In accordance with another aspect, within a given frequency band, the total number of channels (numChan) in each hopping sequence may be defined. And further, of the total number of channels (numChan), a subset of channels (m) may be defined as acquisition (ACQ) channels, and all other channels (numChan-m) may be defined as data channels. In one embodiment, as a network device hops from one channel to the next in its assigned frequency hopping sequence, the dwell time on each channel may be long, for example, around 400 msec. In other embodiments, the dwell time may be shorter or longer than 400 msec.

In one embodiment, devices in the FHSS network may communicate within the 902-928 MHz frequency band. In that embodiment, the following may apply:
numChan=64 (64 total channels)
N=16 (16 hopping sequences)
m=4 (4 Acquisition Channels)
60 data channels
Dwell time per channel=400 msec
Hopping sequence repeats every 64 * 0.4=25.6 seconds That is, in this embodiment, each network device is assigned to one of 16 frequency hopping sequences. Each hopping sequence includes 64 channels, of which, 4 are acquisition channels. The dwell time on each channel for each network device is 400 msec, resulting in a hopping sequence repeating every 25.6 seconds. Table 1, below and in FIGS. 4A and 4B, illustrates this embodiment, and includes 16 hopping sequences having four acquisition channels (4, 20, 36, and 52) each. These channels represent an offset into a pseudo-random channel sequence. At the four acquisition channels, each frequency hopping sequence is tuned to the same channel. In Table 1, each hopping sequence is shown as a series of 64 channels, numbered 0 through 63. For example, frequency hopping sequence "0" begins in time "0" on frequency "0," followed by time period "1" on frequency "1", time period "2" on frequency "2", and so on. Frequency hopping sequence "1" begins in time "0" on frequency "61," followed by time period "1" on frequency "62," time period "2" on frequency "63," time period "4" on frequency "0" and so on. It is understood that each frequency (0, 1, 2, 3, 4 . . . 63) constitutes a different frequency, or channel, within the 902-928 MHz frequency band.

As illustrated in Table 1, in this example embodiment, the four ACQ channels in each frequency hopping sequence coincide at time periods 4, 20, 36, and 52 in each sequence. Thus, when one network device is tuned to an acquisition channel in the frequency hopping sequence utilized by that device, each of the other network devices within the network will also be tuned to the same acquisition channel in their respective hop sequences—even though the other frequencies in their respective hop sequences may not be the same at any given time. As described hereinafter, these acquisition channels may be used to facilitate synchronization of clock circuitry within each device with a common network time and to facilitate the transmission of broadcast messages to devices in the network. While in this embodiment, num-Chan=64, N=16, and m=4, it is understood that in other embodiments, different numbers of total channels, different numbers of hop sequences, and different numbers of acquisition channels may be employed—either more or less in each case. Moreover, it is understood that while in this example embodiment the channels are spread across the 902-928 MHz frequency band, the techniques described herein may be employed across other frequency bands.

an ISM based system. In one embodiment, hopping sequences may be uniquely defined or based on different offsets into one pseudo-random sequence. All the network devices (regardless of hopping sequence) may be synchronized to the same network time, and as illustrated by

TABLE 1

| | | Frequency Hopping Sequences | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Network Time Slot | t (0) | 0 | 61 | 58 | 55 | 51 | 48 | 45 | 42 | 39 | 35 | 32 | 29 | 26 | 23 | 19 | 16 |
| | t (1) | 1 | 62 | 59 | 56 | 53 | 49 | 46 | 43 | 40 | 37 | 33 | 30 | 27 | 24 | 21 | 17 |
| | t (2) | 2 | 63 | 60 | 57 | 54 | 50 | 47 | 44 | 41 | 38 | 34 | 31 | 28 | 25 | 22 | 18 |
| | t (3) | 3 | 0 | 61 | 58 | 55 | 51 | 48 | 45 | 42 | 39 | 35 | 32 | 29 | 26 | 23 | 19 |
| | t (4) | 4 | 4 | 4 | 4 | 4 | 4 | 4 | 4 | 4 | 4 | 4 | 4 | 4 | 4 | 4 | 4 |
| | t (5) | 5 | 1 | 62 | 59 | 56 | 53 | 49 | 46 | 43 | 40 | 37 | 33 | 30 | 27 | 24 | 21 |
| | t (6) | 6 | 2 | 63 | 60 | 57 | 54 | 50 | 47 | 44 | 41 | 38 | 34 | 31 | 28 | 25 | 22 |
| | t (7) | 7 | 3 | 0 | 61 | 58 | 55 | 51 | 48 | 45 | 42 | 39 | 35 | 32 | 29 | 26 | 23 |
| | t (8) | 8 | 5 | 1 | 62 | 59 | 56 | 53 | 49 | 46 | 43 | 40 | 37 | 33 | 30 | 27 | 24 |
| | t (9) | 9 | 6 | 2 | 63 | 60 | 57 | 54 | 50 | 47 | 44 | 41 | 38 | 34 | 31 | 28 | 25 |
| | t (10) | 10 | 7 | 3 | 0 | 61 | 58 | 55 | 51 | 48 | 45 | 42 | 39 | 35 | 32 | 29 | 26 |
| | t (11) | 11 | 8 | 5 | 1 | 62 | 59 | 56 | 53 | 49 | 46 | 43 | 40 | 37 | 33 | 30 | 27 |
| | t (12) | 12 | 9 | 6 | 2 | 63 | 60 | 57 | 54 | 50 | 47 | 44 | 41 | 38 | 34 | 31 | 28 |
| | t (13) | 13 | 10 | 7 | 3 | 0 | 61 | 58 | 55 | 51 | 48 | 45 | 42 | 39 | 35 | 32 | 29 |
| | t (14) | 14 | 11 | 8 | 5 | 1 | 62 | 59 | 56 | 53 | 49 | 46 | 43 | 40 | 37 | 33 | 30 |
| | t (15) | 15 | 12 | 9 | 6 | 2 | 63 | 60 | 57 | 54 | 50 | 47 | 44 | 41 | 38 | 34 | 31 |
| | t (16) | 16 | 13 | 10 | 7 | 3 | 0 | 61 | 58 | 55 | 51 | 48 | 45 | 42 | 39 | 35 | 32 |
| | t (17) | 17 | 14 | 11 | 8 | 5 | 1 | 62 | 59 | 56 | 53 | 49 | 46 | 43 | 40 | 37 | 33 |
| | t (18) | 18 | 15 | 12 | 9 | 6 | 2 | 63 | 60 | 57 | 54 | 50 | 47 | 44 | 41 | 38 | 34 |
| | t (19) | 19 | 16 | 13 | 10 | 7 | 3 | 0 | 61 | 58 | 55 | 51 | 48 | 45 | 42 | 39 | 35 |
| | t (20) | 20 | 20 | 20 | 20 | 20 | 20 | 20 | 20 | 20 | 20 | 20 | 20 | 20 | 20 | 20 | 20 |
| | t (21) | 21 | 17 | 14 | 11 | 8 | 5 | 1 | 62 | 59 | 56 | 53 | 49 | 46 | 43 | 40 | 37 |
| | t (22) | 22 | 18 | 15 | 12 | 9 | 6 | 2 | 63 | 60 | 57 | 54 | 50 | 47 | 44 | 41 | 38 |
| | t (23) | 23 | 19 | 16 | 13 | 10 | 7 | 3 | 0 | 61 | 58 | 55 | 51 | 48 | 45 | 42 | 39 |
| | t (24) | 24 | 21 | 17 | 14 | 11 | 8 | 5 | 1 | 62 | 59 | 56 | 53 | 49 | 46 | 43 | 40 |
| | t (25) | 25 | 22 | 18 | 15 | 12 | 9 | 6 | 2 | 63 | 60 | 57 | 54 | 50 | 47 | 44 | 41 |
| | t (26) | 26 | 23 | 19 | 16 | 13 | 10 | 7 | 3 | 0 | 61 | 58 | 55 | 51 | 48 | 45 | 42 |
| | t (27) | 27 | 24 | 21 | 17 | 14 | 11 | 8 | 5 | 1 | 62 | 59 | 56 | 53 | 49 | 46 | 43 |
| | t (28) | 28 | 25 | 22 | 18 | 15 | 12 | 9 | 6 | 2 | 63 | 60 | 57 | 54 | 50 | 47 | 44 |
| | t (29) | 29 | 26 | 23 | 19 | 16 | 13 | 10 | 7 | 3 | 0 | 61 | 58 | 55 | 51 | 48 | 45 |
| | t (30) | 30 | 27 | 24 | 21 | 17 | 14 | 11 | 8 | 5 | 1 | 62 | 59 | 56 | 53 | 49 | 46 |
| | t (31) | 31 | 28 | 25 | 22 | 18 | 15 | 12 | 9 | 6 | 2 | 63 | 60 | 57 | 54 | 50 | 47 |
| | t (32) | 32 | 29 | 26 | 23 | 19 | 16 | 13 | 10 | 7 | 3 | 0 | 61 | 58 | 55 | 51 | 48 |
| | t (33) | 33 | 30 | 27 | 24 | 21 | 17 | 14 | 11 | 8 | 5 | 1 | 62 | 59 | 56 | 53 | 49 |
| | t (34) | 34 | 31 | 28 | 25 | 22 | 18 | 15 | 12 | 9 | 6 | 2 | 63 | 60 | 57 | 54 | 50 |
| | t (35) | 35 | 32 | 29 | 26 | 23 | 19 | 16 | 13 | 10 | 7 | 3 | 0 | 61 | 58 | 55 | 51 |
| | t (36) | 36 | 36 | 36 | 36 | 36 | 36 | 36 | 36 | 36 | 36 | 36 | 36 | 36 | 36 | 36 | 36 |
| | t (37) | 37 | 33 | 30 | 27 | 24 | 21 | 17 | 14 | 11 | 8 | 5 | 1 | 62 | 59 | 56 | 53 |
| | t (38) | 38 | 34 | 31 | 28 | 25 | 22 | 18 | 15 | 12 | 9 | 6 | 2 | 63 | 60 | 57 | 54 |
| | t (39) | 39 | 35 | 32 | 29 | 26 | 23 | 19 | 16 | 13 | 10 | 7 | 3 | 0 | 61 | 58 | 55 |
| | t (40) | 40 | 37 | 33 | 30 | 27 | 24 | 21 | 17 | 14 | 11 | 8 | 5 | 1 | 62 | 59 | 56 |
| | t (41) | 41 | 38 | 34 | 31 | 28 | 25 | 22 | 18 | 15 | 12 | 9 | 6 | 2 | 63 | 60 | 57 |
| | t (42) | 42 | 39 | 35 | 32 | 29 | 26 | 23 | 19 | 16 | 13 | 10 | 7 | 3 | 0 | 61 | 58 |
| | t (43) | 43 | 40 | 37 | 33 | 30 | 27 | 24 | 21 | 17 | 14 | 11 | 8 | 5 | 1 | 62 | 59 |
| | t (44) | 44 | 41 | 38 | 34 | 31 | 28 | 25 | 22 | 18 | 15 | 12 | 9 | 6 | 2 | 63 | 60 |
| | t (45) | 45 | 42 | 39 | 35 | 32 | 29 | 26 | 23 | 19 | 16 | 13 | 10 | 7 | 3 | 0 | 61 |
| | t (46) | 46 | 43 | 40 | 37 | 33 | 30 | 27 | 24 | 21 | 17 | 14 | 11 | 8 | 5 | 1 | 62 |
| | t (47) | 47 | 44 | 41 | 38 | 34 | 31 | 28 | 25 | 22 | 18 | 15 | 12 | 9 | 6 | 2 | 63 |
| | t (48) | 48 | 45 | 42 | 39 | 35 | 32 | 29 | 26 | 23 | 19 | 16 | 13 | 10 | 7 | 3 | 0 |
| | t (49) | 49 | 46 | 43 | 40 | 37 | 33 | 30 | 27 | 24 | 21 | 17 | 14 | 11 | 8 | 5 | 1 |
| | t (50) | 50 | 47 | 44 | 41 | 38 | 34 | 31 | 28 | 25 | 22 | 18 | 15 | 12 | 9 | 6 | 2 |
| | t (51) | 51 | 48 | 45 | 42 | 39 | 35 | 32 | 29 | 26 | 23 | 19 | 16 | 13 | 10 | 7 | 3 |
| | t (52) | 52 | 52 | 52 | 52 | 52 | 52 | 52 | 52 | 52 | 52 | 52 | 52 | 52 | 52 | 52 | 52 |
| | t (53) | 53 | 49 | 46 | 43 | 40 | 37 | 33 | 30 | 27 | 24 | 21 | 17 | 14 | 11 | 8 | 5 |
| | t (54) | 54 | 50 | 47 | 44 | 41 | 38 | 34 | 31 | 28 | 25 | 22 | 18 | 15 | 12 | 9 | 6 |
| | t (55) | 55 | 51 | 48 | 45 | 42 | 39 | 35 | 32 | 29 | 26 | 23 | 19 | 16 | 13 | 10 | 7 |
| | t (56) | 56 | 53 | 49 | 46 | 43 | 40 | 37 | 33 | 30 | 27 | 24 | 21 | 17 | 14 | 11 | 8 |
| | t (57) | 57 | 54 | 50 | 47 | 44 | 41 | 38 | 34 | 31 | 28 | 25 | 22 | 18 | 15 | 12 | 9 |
| | t (58) | 58 | 55 | 51 | 48 | 45 | 42 | 39 | 35 | 32 | 29 | 26 | 23 | 19 | 16 | 13 | 10 |
| | t (59) | 59 | 56 | 53 | 49 | 46 | 43 | 40 | 37 | 33 | 30 | 27 | 24 | 21 | 17 | 14 | 11 |
| | t (60) | 60 | 57 | 54 | 50 | 47 | 44 | 41 | 38 | 34 | 31 | 28 | 25 | 22 | 18 | 15 | 12 |
| | t (61) | 61 | 58 | 55 | 51 | 48 | 45 | 42 | 39 | 35 | 32 | 29 | 26 | 23 | 19 | 16 | 13 |
| | t (62) | 62 | 59 | 56 | 53 | 49 | 46 | 43 | 40 | 37 | 33 | 30 | 27 | 24 | 21 | 17 | 14 |
| | t (63) | 63 | 60 | 57 | 54 | 50 | 47 | 44 | 41 | 38 | 34 | 31 | 28 | 25 | 22 | 18 | 15 |

An FHSS hop sequence typically distributes communications over a large part of the frequency spectrum. FCC rules specify that equal channel utilization must be achieved with example in Table 1, the time slots or steps, used for the acquisition channels, are common for all hop sequences. The data channels may be randomized, and for a given time period, or network time step, i.e. t(x), each hopping sequence uses a unique data channel. In certain embodiments, this may only be the case if there are fewer hopping sequences than data channels.

An FHSS implementation means that endpoint devices listen on their assigned channel in each specific time slot. If an endpoint needs to transmit to a neighbor, it will transmit on the channel that the receiving endpoint is listening. Consequently, a transmitting unit must know the frequency hopping sequence of the neighbor in order to communicate. For devices that are time synchronized and not transmitting, the device may listen (i.e. in a receive mode) on the channel defined for that specific time for that specific hopping sequence. For example, referring to Table 1, at the "t(9)" time step a device assigned to hopping sequence "7" listens on channel "50." For devices that are time synchronized and transmitting, the transmitting device knows the hopping sequence of the destination (next hop) device and transmits on the proper channel for the receiving device. Immediate acknowledgements may be sent on the same channel as the received message. In an embodiment, the transmitting device may stay on the same channel when waiting for an immediate response.

As mentioned above, in accordance with one aspect disclosed herein, the acquisition channel(s) may be utilized to expedite special network communications within the mesh network. These communications may include synchronization commands, network registration, neighbor discovery and re-synch after outage. Devices that are not yet time synchronized may be in a passive mode or an active mode. In an embodiment, devices not synchronized are required to be in a passive mode. In a passive mode, the device may stay in a receive mode on one of the acquisition channels for a predetermined amount of time, which represents a timeout period. If during this timeout period, the device does not receive a network time on the current acquisition channel, the device may switch to a different acquisition channel. In one embodiment, the time period between changing acquisition channels may be directly related to the period between time broadcasts. In the active mode, a device may periodically transmit on one or more acquisition channels attempting to locate a device or network.

Acquisition channels may be distributed across the available frequency band. As mentioned, acquisition channels may be used to broadcast messages, to send time synchronization messages, to perform neighbor discovery, or during initial network formation. In other embodiments, acquisition channels may serve other functions.

Neighbor discovery is a process by which a network device (e.g., meter 114 or collector 116) is able to discover the existence of other devices within its communication range. In a mesh network of meters, neighbor devices may function as intermediate nodes on a communication path between a meter and the collector on its LAN/subnet. Although neighbor discovery may be performed on data channels, the use of acquisition channels as described herein may be advantageous. A goal of neighbor discovery is for a device to discover the neighbor devices in its communication range with which the device can communicate with at a high level of performance. Neighbor discovery may occur for both synchronized and unsynchronized devices. In order to communicate with a neighbor device, a neighbor table may be employed. In one embodiment, a neighbor table may be maintained by each network device and may include, for each discovered neighbor, an identity of the neighbor device, such as for example an 8-byte MAC address and an indication of the frequency hopping sequence used by that neighbor. During neighbor discovery, two neighbors will exchange this information so that each can store it in its respective neighbor table. In one embodiment, in addition to an 8-byte MAC address, a device could also store an optional 2-byte short address for a given neighbor, which short address could be assigned by another network entity, such as a collector 116 or an LBR.

Once neighbors are discovered, they may be used for routing messages in the network. By knowing both the network time and the hopping sequence of the destination (next hop) device, a transmitting device can determine the correct channel for the communication.

As further mentioned above, network formation is another form of network communications within a mesh network that may utilize the acquisition channels described herein. Devices that are not "connected" to the network may use acquisition channels to join the network. In an embodiment, the collector 116 can initiate network formation by issuing a scan of nodes using an acquisition channel. When each node replies, it can be provided with a time synchronization message to synchronize its internal clock, and each node can provide the collector 116 with its respective hop sequence. The collector 116 may attach to each of the nodes and may communicate with each device by using the appropriate hop frequency. At a later time, the next acquisition channel can be utilized to reach unregistered devices that might be listening on that acquisition channel. Again, the collector 116 may synchronize the unregistered devices and receive the appropriate hop sequences for further communications. After the first level nodes are registered, these nodes can then proceed in a similar manner to synchronize and register second hop devices.

Another form of network communication that may be performed on the acquisition channels is broadcast messaging. In one embodiment, when broadcasting a message, the start of the broadcast, e.g. at a LoWPAN Border Router (LBR), may be sent on the next acquisition channel within the frequency hopping sequences. In an embodiment, high priority broadcast messages may be sent on the next acquisition channel. The start of the broadcast may also be sent on a randomly selected acquisition channel from the next brdcstAcqSlots, where brdcstAcqSlots may be assigned for a network or for each message. In an embodiment, broadcasting on a randomly selected acquisition channel is used for low priority messages. After the message has been broadcasted, the broadcasted message may propagate through the network with each device re-sending, or re-broadcasting, on the acquisition channel. Devices receiving the broadcast may re-broadcast in the same dwell period if they can obtain a clear channel. If a device cannot obtain a clear channel prior to the end of the acquisition channel dwell time, the device may broadcast the message in the next acquisition channel dwell time.

Network time synchronization may also be performed using the acquisition channels. Devices that are not yet time synchronized to the network time—which may be maintained, for example, by a collector 116 via its network communications with a utility head-end-may receive synchronization messages from a collector 116 on the acquisition channels. It should be appreciated that synchronized devices may also receive time synchronization messages. In a synchronous frequency hopping network, time synchronization across all devices is desirable. For example, assume time accuracy that exists between devices that have clock crystals with 10 ppm accuracy. For these endpoint devices, in a one hour period of time, time may "slip" between devices as much as 36 msec. If a frequency hopping sequence uses a dwell time of 400 msec, then 36 msec slip represents a 9% error.

FIG. 3 is an illustration of an embodiment of a time re-synchronization process 300 that may be performed by a device in the network, such as a meter 114, when the meter 114 is in a passive mode. At step 302, the network device tunes to an acquisition channel. At step 304, the network device checks whether it has received a time synchronization message. This step may be performed, for example, after a time synchronization message has been broadcasted. The broadcast may be transmitted by another network device, such as meter 114 or collector 116, or by a network management system. In one embodiment, the time synchronization message may be broadcasted on a plurality of the acquisition channels in each frequency hopping sequence employed in the network. If a time synchronization message is determined to have been received, then at step 306, the device is synchronized to the network time indicated in the received time synchronization message.

A time synchronization message contains information representing the current time as determined and maintained by a network entity, such as by a head-end system operated by a utility. In one embodiment, a collector (e.g., collector 116) may receive absolute time from a master station of the utility periodically, and an absolute time may be transmitted to the other network devices in a time synchronization message once per day. But in other embodiments, a time synchronization message may comprise a value representing a number of fixed intervals (i.e. N×5 msec) from a certain pre-determined time, such as midnight, to minimize the amount of space taken in the packet of the time synchronization message. If a network device is registering to the collector for the first time, it should receive the absolute time. In the different hop levels of the network, the communication packet time preferably is accounted for and adjusted within the next packet. When a network device receives a time synchronization message, it extracts the network time from the message and may compare it to the time value maintained by its internal clock circuitry to determine whether the device is in sync. If the device is not in sync, then the device may replace its internal clock circuit time value with the received network time value to synchronize to the network time. For example, the clock circuitry may comprise a counter, and the device may replace its current counter value with the value representing the network time received in the time synchronization message.

At step 308, after the device has been time synchronized, the device may re-broadcast the time synchronization message. The re-broadcast may either be performed on the channel in which the broadcasted message was received, or if the signal is not clear, then it may be re-broadcasted on the next clear acquisition channel. Thereafter, at step 310, the device hops from channel to channel according to its assigned frequency hopping sequence.

Returning to step 304, if a broadcasted time synchronization message has not been received, then, at step 312, it is determined whether the device is within a timeout period. The timeout period represents a predetermined amount of time in which the device will remain on a given acquisition channel. If the device is within the timeout period, the device continues to listen for a time synchronization message on its current acquisition channel. If the timeout period expires without receipt of a time synchronization message, then the device may be tuned to a different acquisition channel, where it begins listening on the new acquisition channel for a time synchronization message. This process may continue until a time synchronization message is received by the network device.

In one embodiment, time synchronization messages are periodically transmitted by a network entity, such as a collector 116 or other device, on the acquisition channel(s). In one alternative embodiment, the time synchronization messages may be transmitted by a LoWPAN Border Router (LBR). For example, in the embodiment described above in which there are four ACQ channels, each y times through a frequency hopping sequence, the network entity may select one of the four acquisition channels and broadcast a time synchronization message. Devices receiving the broadcast may re-broadcast in the same dwell period if they can obtain a clear channel. If a device cannot obtain a clear channel prior to the end of the current acquisition channel dwell time, it may attempt to re-broadcast the time synchronization message in the next acquisition channel dwell time. By using acquisition channels for this purpose, both already synchronized devices (which may or may not require an updates based on the transmitted network time) and unsynchronized devices receive time synchronization messages in a reasonably short amount of time.

In another embodiment, time synchronization message broadcasts may be configured to occur on one acquisition channel for each frequency hopping sequence period. In the example scenario described above, these time broadcasts would occur every 25.6 seconds (i.e., once every time through a complete hopping sequence). By way of further example, the timeout period during which an unsynchronized device may listen on a current acquisition channel before moving to a next acquisition channel (e.g., in step 312 of FIG. 3) may be 4*25.6 seconds=102.4 seconds. If after that amount of time a time synchronization message has not been received, the device may tune to a next acquisition channel. In various embodiments, the duty cycle of time synchronization broadcast messages may be increased to reduce synchronization time.

While the disclosure is described herein using a limited number of embodiments, these specific embodiments are for illustrative purposes and are not intended to limit the scope of the disclosure as otherwise described and claimed herein. Modification and variations from the described embodiments exist. The scope of the invention is defined by the appended claims.

What is claimed is:

1. A communication system comprising at least a first network device and a second network device, each network device including a transceiver;

the first network device operating in accordance with a first frequency hopping sequence, wherein the first frequency hopping sequence includes a plurality of data channels and at least one acquisition channel used to facilitate clock circuitry synchronization within the first network device; and the second network device operating in accordance with a second frequency hopping sequence, wherein the second frequency hopping sequence includes a plurality of data channels and the at least one acquisition channel, wherein the second frequency hopping sequence is different from the first frequency hopping sequence, and wherein the at least one acquisition channel of the first frequency hopping sequence and the at least one acquisition channel of the second frequency hopping sequence are synchronized in time in their respective frequency hopping sequences such that when the second network device is tuned to the at least one acquisition channel in the second frequency hopping sequence, the first network device will be tuned at substantially the same time to the at least one acquisition channel in the first frequency hopping sequence, and wherein the frequency of the at least one acquisition channel in each of the first and the second frequency hopping sequences is the same.

2. The system of claim 1, wherein the transceiver of the first network device is configured to tune to the at least one acquisition channel of the first frequency hopping sequence and receive thereon a time synchronization message, and wherein a clock of the first network device is configured to synchronize the first network device to a network time based on the time synchronization message.

3. The system of claim 2, wherein the first network device is configured to hop from one frequency to another frequency according to the first frequency hopping sequence after the clock of the first network device is synchronized with the network time.

4. The system of claim 2, wherein the first network device is configured to broadcast the time synchronization message on the at least one acquisition channel.

5. The system of claim 4, wherein the second network device is further configured to re-broadcast the time synchronization message on the at least one acquisition channel.

6. The system of claim 2, wherein the transceiver of the second network device is configured to tune to the at least one acquisition channel of the second frequency hopping sequence and receive thereon the time synchronization message, and wherein a clock of the second network device is configured to synchronize the second network device to the network time based on the time synchronization message.

7. The system of claim 2, further comprising:
at least one other network device operating in accordance with an assigned frequency hopping sequence, wherein the at least one other network device is in a receive mode on one of the at least one acquisition channels until the time synchronization message is received, after the time synchronization message is received, the at least one other network device hops from one frequency to another frequency according to the assigned frequency hopping sequence.

8. The system of claim 1, wherein the first frequency hopping sequence and the second frequency hopping sequence are defined at the time of manufacture of the first network device and the second network device, respectively.

9. The system of claim 1, wherein the first network device is configured to initiate network formation by issuing a scan of each network device using the at least one acquisition channel, wherein the first network device is further configured to provide each network device using the at least one acquisition channel with a time synchronization message to synchronize their respective clocks.

10. The system of claim 1, wherein the first network device is configured to discover neighboring network devices, and wherein the first network device is capable of communicating with each neighboring network device.

11. The system of claim 10, the first network device is further configured to store, in a memory, information related to the frequency hopping sequence of each neighboring device.

12. A method for communication comprising:
assigning a first frequency hopping sequence to a first network device, wherein the first frequency hopping sequence includes a plurality of data channels and at least one acquisition channel used to facilitate clock circuitry synchronization within the first network device; and
assigning a second frequency hopping sequence to a second network device, wherein the second frequency hopping sequence includes a plurality of data channels and the at least one acquisition channel,
wherein the second frequency hopping sequence is different from the first frequency hopping sequence, and wherein the at least one acquisition channel of the first frequency hopping sequence and the at least one acquisition channel of the second frequency hopping sequence are synchronized in time in their respective frequency hopping sequences such that when the second network device is tuned to the at least one acquisition channel in the second frequency hopping sequence, the first network device will be tuned at substantially the same time to the at least one acquisition channel in the first frequency hopping sequence, and wherein the frequency of the at least one acquisition channel in each of the first and the second frequency hopping sequences is the same.

13. The method of claim 12, further comprising:
tuning, by a transceiver of the first network device, to the at least one acquisition channel of the first frequency hopping sequence;
receiving thereon a time synchronization message; and
synchronizing, by a clock of the first network device, the first network device to a network time based on the time synchronization message.

14. The method of claim 13, further comprising:
hopping, by the first network device, from one frequency to another frequency according to the first frequency hopping sequence after the clock of the first network device is synchronized to the network time.

15. The method of claim 12, further comprising:
assigning a frequency hopping sequence to at least one other network device; and
adding the at least one other network device to the frequency hopping network, wherein the at least one other network device is in a receive mode on one of the at least one acquisition channels until a time synchronization message is received, after the time synchronization message is received, the at least one other network device hops from one frequency to another frequency according to the assigned frequency hopping sequence.

16. The method of claim 12, further comprising:
discovering, by the first network device, neighboring network devices, wherein the first network device is capable of communicating with each neighboring network device.

17. The method of claim 16, further comprising:
storing, in a memory of the first network device, information related to the frequency hopping sequence of each neighboring network device.

18. The system of claim 12, further comprising:
issuing a scan of each network device, by the first network device, using the at least one acquisition channel; and
forming, by the first network device, a frequency hopping network based on the scan of each network device.

19. The system of claim 18, further comprising:
receiving, by the first network device, a reply to the issued scan from each network device; and
initiating, by the first network device, the formation of the frequency hopping network based on the reply to the issued scan.

* * * * *